March 10, 1936.   A. L. R. BERNARD   2,033,810
INTERNAL COMBUSTION ENGINE
Filed Oct. 29, 1934   2 Sheets-Sheet 1

Inventor:
Auguste Louis René Bernard
Attorneys:
Bailey & Larson

March 10, 1936.  A. L. R. BERNARD  2,033,810
INTERNAL COMBUSTION ENGINE
Filed Oct. 29, 1934   2 Sheets-Sheet 2

Inventor:
Auguste Louis René Bernard
Attorneys:

Patented Mar. 10, 1936

2,033,810

UNITED STATES PATENT OFFICE 2,033,810

INTERNAL COMBUSTION ENGINE

Auguste Louis René Bernard, Rueil-Malmaison, France; Renée Bernard (born Bournonville) executrix of said Auguste Louis René Bernard, deceased Application October 29, 1934, Serial No. 750,564
In Belgium October 31, 1933

7 Claims. (Cl. 123—32)

The present invention relates to internal combustion engines, and more especially, but not exclusively, two-stroke engines.

The general object of the invention is to provide an engine of this kind which is better adapted to meet the requirements of actual practice.

There exist internal combustion engines of this kind in which the compression chamber, when the piston is close to its upper extreme position, is in the shape of a torus, or substantially so.

The essential feature of the present invention consists in devising engines of this type in such manner that, when the piston is close to its extreme upper position, the annular peripheral surface of the piston head prolongs, without offset, and preferably substantially tangentially, the walls of this tore-shaped or similar combustion chamber, a very small play existing then between said piston head and the walls of this chamber, in such manner that air, at the end of the upward stroke of the piston, is forced toward the axis of the cylinder, tangentially to the walls of the compression chamber.

According to a first embodiment of the invention, the top of the piston head is given the shape of a body of revolution having a neck, or portion of restricted cross section in its intermediate part, so as to complete the tore-shaped chamber of combustion.

According to another embodiment of the invention, said top of the piston head constitutes a conical or substantially conical projection preferably penetrating into the tore-shaped combustion chamber beyond the median plane thereof.

These, and other, features of the present invention will result from the following detailed description of some specific embodiments thereof.

Preferred embodiments of the present invention will be hereinafter described, with reference to the accompanying drawings, given merely by way of example, and in which.

Figure 1:
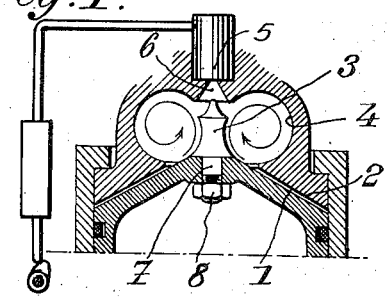
Fig. 1 is an axial sectional view of the upper part of the piston-cylinder portion of an internal combustion engine according to the present invention.

According to the present invention, the engine a portion of which is illustrated by any of the figures of the drawings is devised in any suitable manner, with the exception of the combustion chamber and eventually of the inlet and outlet ports, said engine being for instance of any known type.

Concerning now the combustion chamber, it is made in such manner that when the piston is close to its extreme upper position, it limits a tore-shaped or similar space. Furthermore, when the piston is in its upper extreme position, the piston head prolongs, without offset, and preferably in substantially tangential relation, the walls of said tore-shaped chamber, the play between said piston head and said walls being very small. This play may range between the mechanically permissible minimum, for instance 0.5 millimeter, and several millimeters. For instance for an engine of a bore of 100 millimeters, this play will be equal to 1 millimeter. With this arrangement, the air, at the end of the upward stroke of the piston, is forced toward the axis of the cylinder tangentially to the walls of the combustion chamber.

This leads to giving the piston head the shape of a body of revolution the central portion 3 of which forms a projection adapted to limit the tore-shaped surface in the part thereof that is nearer to its axis. Advantageously, the surface of this projection may be considered as generated by the revolution, about the axis of the piston, of an arc of a curve (for instance a circle) which prolongs, preferably tangentially, the generatrices of the annular peripheral surface of the piston head.

The inner shape of the recess 4 to be provided in the cylinder head is also that of a body of revolution generated by the revolution, about the same axis, of a curve which substantially prolongs this arc of a curve, and which is jointed with the peripheral zone 2 of the cylinder head at a point of a circular neck forming the connection between the recess 4 and the cylinder proper.

Advantageously, injector 5 is disposed at the top of recess 4 and axially with respect thereto, and a passage 6, for instance of conical shape, is provided for affording a communication between the nozzle of the injector and chamber 4.

Preferably, injector 5 is arranged in such manner that the fuel projected by said injector may be distributed in all directions with respect to the common axis of the piston and the cylinder. For this purpose, for instance, this injector is devised in such manner as to direct its jet or jets onto the top of projection 3, so that the fuel is atomized by impinging on said projection and is then deflected laterally.

In order to accentuate this effect, the top of this projection 3 is made of a substantially conical shape, preferably with concave generatrices, the axis of said cone coinciding with the common axis of the cylinder and its piston.

It will be readily understood that when the piston is moving upwardly and is coming near to the end of its stroke, the amount of air that is present in the space between surface 1 and zone 2 is violently forced toward the center along the generatrices of surface 1.

The air streams then flow upwardly along the curved walls of projection 3, and subsequently leave said projection in such manner as to come into tangential contact with the walls of recess 4.

Therefore when the piston is at the end of its upward stroke, that is to say when injection takes place, the air in the combustion chamber is given a gyratory movement along the circles that form the generatrices of the tore and the moving streams of air meet with the jets of atomized liquid which are thus distributed in said air in a homogeneous manner.

Figure 4:
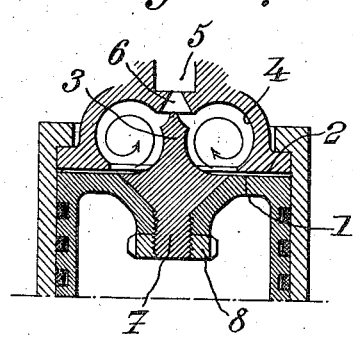
Fig. 4 is a view, similar to Fig. 1, showing the cylinder-piston system of an internal combustion engine made according to another embodiment of the invention.

Of course, the annular peripheral surface 1 of the piston head may be of frusto-conical shape in relief or in projection as shown in Fig. 1. It may also be flat as shown in Fig. 4.

Furthermore, the generatrices of the conical top of projection 3 may, instead of being rectilinear, be given any suitable curved shape, preferably the shape of a curve having its concavity turned toward the head of the cylinder.

In any case, projection 3 may be devised and fixed in position in any suitable manner, provided, however, that it is made of a material having a good resistance to heat, which generally makes it necessary to fix said projection to the piston head instead of making it integral therewith.

Thus, in the embodiment shown by Fig. 1, this projection 3 may be merely provided with a threaded rod 7 at its end, said rod being caused to extend throughout said piston head and being fixed thereto by means of a nut 8 screwed on said rod.

The base of this projection may also be given a larger diameter (for instance about one third of the bore), rod 7 being given a diameter nearly as large or larger and the piston head may even be provided with a frusto-conical housing of the kind shown Fig. 4, between projection 3 and rod 7.

Figure 2:
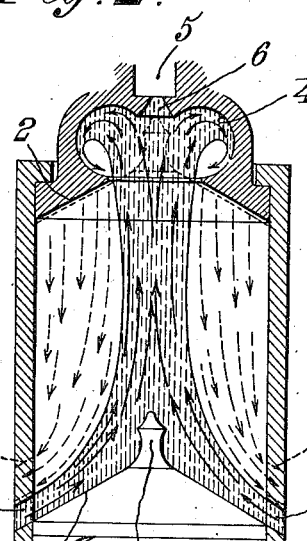
Fig. 2 is a similar view, but in which the piston is shown at the bottom of its stroke in the cylinder.

Concerning now the inlet ports 9, when the engine is provided with such ports, they are preferably directed in such manner that the air entering into the cylinder penetrates in a direction oblique with respect to the axis of said piston, and toward the cylinder head. This arrangement is visible in Fig. 2.

Said inlet ports 9 are then advantageously disposed in such manner that they are diametrically opposed two by two so that the inflowing air may collect in the central portion of the cylinder, so as to form an upwardly moving stream, which penetrates directly into chamber 4 and scavenges it in a perfect manner.

The conduits through which air is fed to the inlet ports 9 may be given an inclination substantially equal to that of the generatrices of the peripheral portion of the piston head, if the latter is convex.

Alternately, and advantageously, these conduits may be given a greater inclination, for instance of from 35 to 70° with respect to planes at right angles to the axis.

It should be noted that, owing to the shape of recess 4, the air that penetrates thereinto tends to be given a whirlwind motion in the same direction as the motion that will be subsequently given thereto when the piston moves upwardly up to its upper extreme position.

Concerning now the outlet ports 10, when the engine is provided with such ports, they are disposed also in the vicinity of the base of the cylinder, owing to which arrangement when the air admitted into the cylinder, after having moved upwardly in the central zone of the cylinder, moves down in the peripheral zone, driving along the burnt gases of the preceding cycle, said gases are thus driven toward said outlet ports 10.

In order to avoid, as far as possible, the mixing of the incoming air with the outflowing gases, it is advantageous, especially if the inlet ports 9 are at least partly disposed at the same level as the outlet ports 10, to distribute the latter in the intervals between the inlet ports 9, in such manner that, in plan view, the outlet ports 10 may be located in angular zones different from that occupied by the inlet ports 9 on the periphery of the cylinder.

Figure 3:
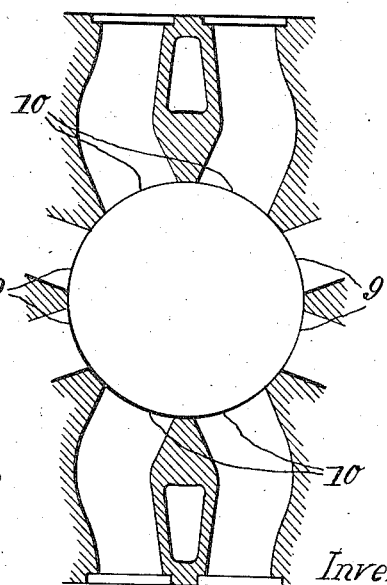
Fig. 3 is a sectional view through the ports of the cylinder shown in Fig. 2.

It is even advantageous to group the ports as shown in Fig. 3, that is to say to dispose the outlet ports 10 in the zones between the inlet ports 9. The outflowing gases shall thus be given a sufficient passage for flowing toward the outlet ports 10 and shall have but the minimum contact with the incoming air.

Figure 5:
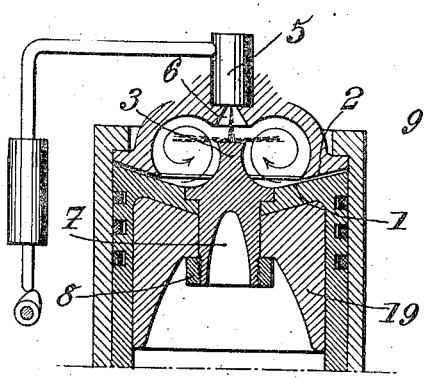
Fig. 5 is a view similar to Fig. 1 showing still another embodiment.
Figure 5:
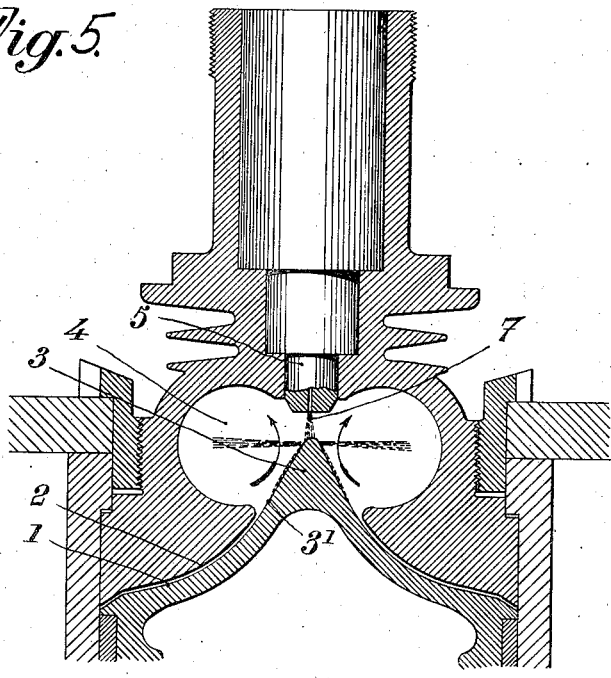

In the embodiment of Fig. 5, the projection 3 of the piston head is given a substantially conical shape and it is preferably made of such a height as to penetrate into the tore-shaped chamber 4 beyond the horizontal median plane of said chamber.

Figure 6:
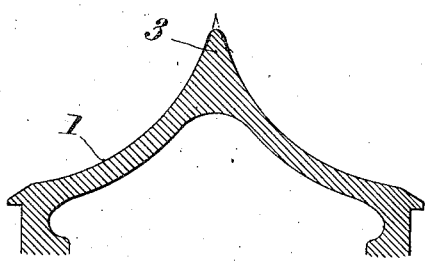
Fig. 6 is a sectional view showing a modification of the piston-head.

It is for instance possible to give this projection a height of the same order of magnitude as the diameter of its base and to give it the shape of a cone either slightly rounded or eventually slightly truncated at the top, this cone having either rectilinear generatrices, as shown in Fig. 5, or curved generatrices, as shown in Fig. 6.

Preferably, these generatrices will prolong, without any off-set, the generatrices of the periphery of the piston head, thus constituting, together with them, a continuous or slightly broken line.

Due to the shape of this projection 3, the piston head shall be provided, for connecting the cylinder proper with chamber 4, with an orifice of a diameter slightly larger than the diameter of the base of this projection, said orifice being so positioned that it is located at the level of said base when the piston is in the vicinity of its upper extreme position, as shown in Fig. 5.

In the embodiment of Fig. 6, the curvilinear generatrices of projection 3 are concave, that is to say have their concavity turned outwardly.

The chief advantage of the embodiments of Figs. 5 and 6 is that the shape of projection 3 facilitates the evacuation of the calories received by said projection toward the body of the piston. However, this shape does not involve, for the combustion chamber, a shape which differs too much from that of a tore.

The advantages of the arrangement above described result sufficiently clearly from this description for making it unnecessary to give long explanations on said advantages.

However it should be noted that the internal combustion engines according to the present invention have the following advantages over engines in which the combustion chamber is so arranged that the whirlwind movement takes place in a direction opposite to that above described, although the combustion chamber is also tore-shaped:

(a) The piston is of lighter weight because the projection carried by said piston is of smaller dimensions;

(b) The heating of the piston is very much reduced because a smaller area thereof is exposed to the combustion and because the particles of air that meet with the jet of fuel are directed toward the cylinder head, which is cooled, and not toward the piston;

(c) The temperature of the edges that one of the elements limiting the combustion chamber must necessarily carry is much lower because, according to the present invention, these edges are carried by the cylinder head, which is efficiently cooled;

(d) The loss of pressure is reduced, as well during compression as during combustion and expansion, the passage afforded to air for entering into recess 4 being restricted only at the end of upward stroke of the piston, when a violent impulse is produced, which causes an intensive gyratory movement.

Finally, as above stated, the whirlwind movement that is started when scavenging air enters chamber 4 takes place in the same direction as that produced, at the end of the upward stroke of the piston, by the peculiar shape of the piston and of the cylinder head.

Of course, while it has been stated, by way of example, in the preceding description, that the generatrices and directrices of the surface limiting the combustion chamber are advantageously circles, this is in no way limitative and they might consist of other curves, such as ellipses for instance.

As for the arrangement of the inlet and outlet ports above described, they are not necessarily combined with the particular arrangement of the combustion chamber above described.

In a general manner, while I have, in the above description, endeavoured to disclose practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. An internal combustion engine which comprises, in combination, a cylinder, a cylinder head, a tore-shaped combustion chamber in said cylinder head, said cylinder head having an opening therein connecting the interior of the combustion chamber with the interior of said cylinder, a piston, a pointed projection on the piston arranged to penetrate through said opening into said combustion chamber at the end of the in-stroke of the piston, said projection having surfaces which prolong the walls of the combustion chamber when the piston is at the end of its in-stroke to complete substantially the tore-shaped surface of the combustion chamber, the peripheral zone of the front of said piston and the exterior wall of said cylinder head surrounding said opening being shaped to produce at the end of the in-stroke of the piston an in-rush of air radially inwardly against said projection of the piston, and a fuel injector opening into said chamber and adapted to project a fuel jet onto the apex of the pointed end of said projection of the piston, said fuel jet being co-axial with said projection.

2. An internal combustion engine which comprises, in combination, a cylinder head, a tore-shaped combustion chamber in said cylinder head, said cylinder head having an opening therein connecting the interior of the combustion chamber with the interior of said cylinder, a piston, a pointed projection on the piston arranged to penetrate through said opening into said combustion chamber at the end of the in-stroke of the piston, said projection having the shape of a body of revolution coaxial with said chamber and the vertical cross section of which is bounded by two curves, symmetrical with respect to the cylinder axis and having their concavities turned toward the outside, with a substantially conical point at the top of said body, said curves being so shaped that this body of revolution prolongs the walls of the combustion chamber when the piston is at the end of its in-stroke so as to complete substantially the tore-shaped surface of the combustion chamber, the peripheral zone of the front of said piston and the exterior wall of said cylinder head surrounding said opening being shaped to produce at the end of the in-stroke of the piston an in-rush of air radially inwards against said projection of the piston, and a fuel injector opening into said chamber and adapted to project a fuel jet onto the apex of the pointed end of said projection of the piston, said fuel jet being coaxial with said projection.

3. An internal combustion engine which comprises, in combination, a cylinder, a cylinder head, a tore-shaped combustion chamber in said cylinder head, said cylinder head having an opening therein connecting the interior of the combustion chamber with the interior of said cylinder, a piston, a conical projection on the piston arranged to penetrate through said opening into said combustion chamber at the end of the in-stroke of the piston, said projection having surfaces which prolong the walls of the combustion chamber when the piston is at the end of its in-stroke to complete substantially the tore-shaped surface of the combustion chamber, the peripheral zone of the front of said piston and the exterior wall of said cylinder head surrounding said opening being shaped to produce at the end of the in-stroke of the piston an in-rush of air radially inwardly against said projection of the piston, and a fuel injector opening into said chamber and adapted to project a fuel jet onto the apex of the pointed end of said projection of the piston, said fuel jet being coaxial with said projection.

4. An internal combustion engine according to claim 1, in which the apex of the pointed projection of the piston is slightly rounded.

5. An internal combustion engine according to claim 1 in which the peripheral portion of the piston head around said projection has the shape of a cone projecting toward said combustion chamber.

6. An internal combustion engine according to claim 3 in which the generatrices of said conical projection are rectilinear.

7. An internal combustion engine according to claim 3 in which the generatrices of said conical projection are slightly curved.

AUGUSTE LOUIS RENÉ BERNARD.